March 22, 1938.　　　　G. A. VAN DE LUNE　　　　2,111,683
TANK GAUGE
Filed April 30, 1937　　　　2 Sheets-Sheet 1
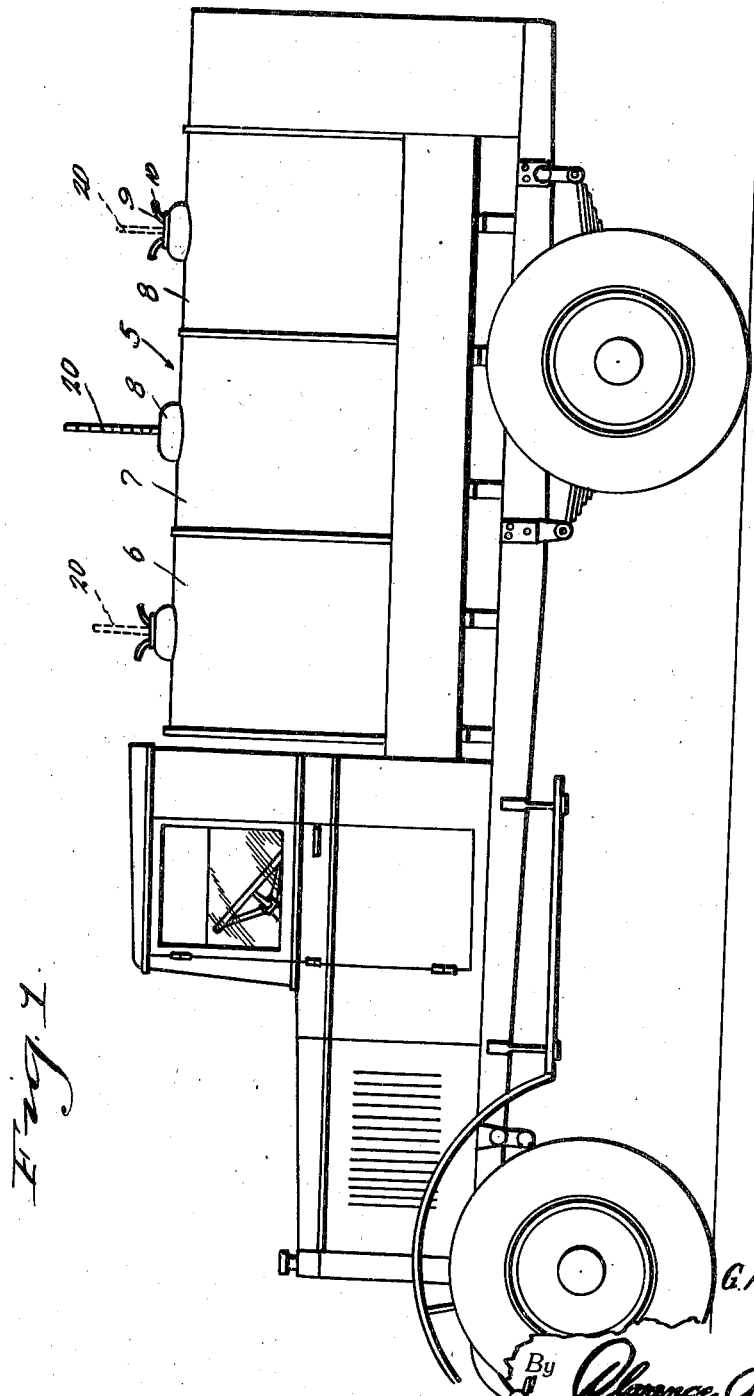
Inventor
G. A. Van de Lune
By Clarence A. O'Brien
Hyman Berman
Attorneys March 22, 1938.  G. A. VAN DE LUNE  2,111,683
TANK GAUGE
Filed April 30, 1937   2 Sheets-Sheet 2
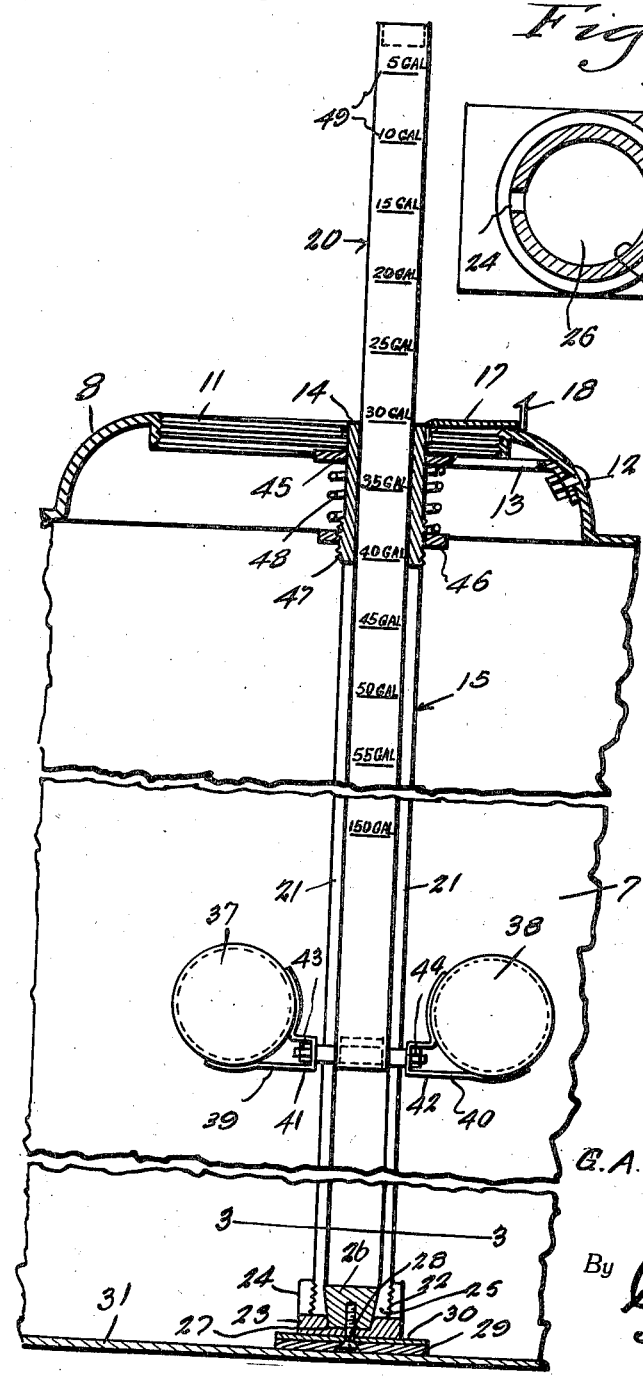
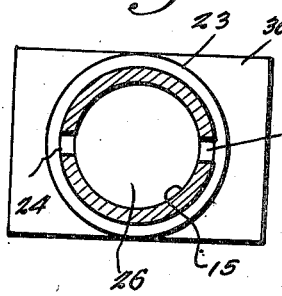
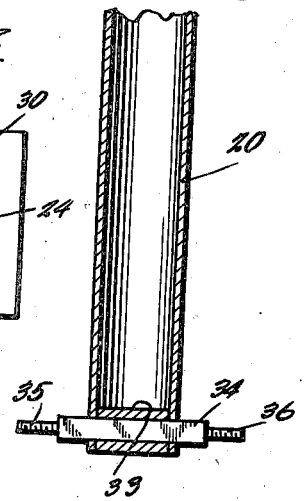
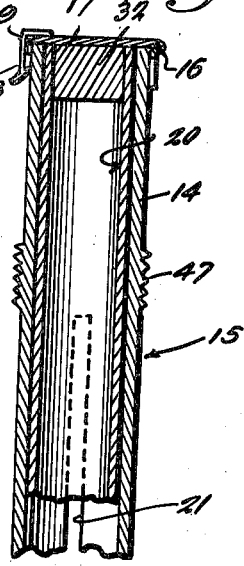
Inventor
G. A. Van de Lune
By Clarence A. O'Brien
Hyman Berman
Attorneys Patented Mar. 22, 1938

2,111,683

UNITED STATES PATENT OFFICE 2,111,683

TANK GAUGE

Gerrit A. Van de Lune, Oskaloosa, Iowa

Application April 30, 1937, Serial No. 140,041

2 Claims. (Cl. 73—311)

My invention relates generally to means for indicating and measuring the amount of liquid in a container, and particularly to a gauge for the tank compartments of hydrocarbon fuel delivery tanks and the like, and an important object of my invention is to provide arrangements of this character which are inexpensive and practical, and which greatly facilitate the operations of filling and emptying the tanks of measured amounts of liquid.

Another important object of my invention is to provide a structural mounting for a float operated liquid tank gauge which insulates the gauge from the effects of static electricity, eliminates destruction and distortion due to vibration, and greatly facilitates the installation of the same in existing compartments of tanks of the character alluded to above.

Other important objects of my invention will be apparent from a reading of the following description taken in connection with the drawings, wherein for purposes of illustration I have shown a preferred embodiment of my invention.

In the drawings:—

Figure 1 is a general side elevational view of a delivery tank truck showing gauges in accordance with the present invention applied thereto.

Figure 2 is an enlarged transverse vertical sectional view taken through one of the tank compartments and illustrating the installation of a gauge therein in accordance with the present invention.

Figure 3 is a horizontal sectional view taken through Figure 2 approximately on the line 3—3.

Figure 4 is a vertical transverse sectional view taken through the upper part of the stationary portion of the gauge and the gauge rod and showing the retaining cap in place.

Figure 5 is a transverse vertical sectional view taken through the lower end of the movable gauge rod and showing the float mountings thereon.

Referring in detail to the drawings, the numeral 5 generally designates an automobile truck such as is used for the transportation and delivery of hydrocarbon liquid, and other liquid, the said tank having separated compartments 6, 7, and 8 each provided with a dome such as the dome 8, closed by a screw cover 9 which is provided with handles 10. The cover is threaded into a threaded collar 11 in the top of the dome. In accordance with the present invention I fasten by suitable bolts 12 to one side of the dome 8 a bracket 13 which extends horizontally away from the side of the dome and this bracket has an opening receiving slidably the upper part 14 of the gauge rod guide tube 15. Hinged as indicated by the numeral 16 to one side of the top of the portion 14 is a closure cap 17 which has a spring latch 18 engageable with a detent 19 on the opposite side of the portion 14 to keep the cap in a closed position. The cap can be opened to the position illustrated in Figure 2 from the closed position illustrated in Figure 4 to permit the gauge rod which is generally designated 20 to rise through the portion 14 of the guide tube 15. The guide tube 15 has slots 21 in its opposite sides which extend through the lower end thereof which is threaded as indicated by the numeral 22 and screwed into a cup 23 which has vertical slots 24 conforming to and registering with the slots 21. The inside of the lower end of the tube 15 is tapered as indicated by the numeral 25 and a conformably shaped truncated conical block or plug 26 is seated in this reduced portion and in a recess 27 in the top of the bottom of the cup.

A screw 28 is threaded into the plug 26 from the bottom thereof and this screw passes through an asbestos plate 29 and through a metal plate 30 to assemble these with the cup 23 on the lower end of the tube 15. The asbestos block 29 rests on the bottom 31 of the tank compartment 7 to prevent the transmission of static electricity from the bottom of the tank to the tube and to the gauge rod 20 and also to provide a sufficiently flexible mounting to permit expansion and contraction of the structure as the result of temperature changes; and to provide a sufficiently shock-absorbing mounting of the gauge to prevent destructive action on the gauge as a result of vibration of the truck in its travels.

The gauge rod 20 is of an outside diameter to slide smoothly in the guide tube portion 14 and in the remainder of the tube and it has a block 32 secured in its upper end and closing the upper end and affording support against collapse of the gauge rod, the gauge rod being in the form of a tube and having another block 33 fastened in its lower end and traversed by a squared bar 34 which has its opposite ends extending beyond the sides of the gauge rod and provided with threaded and reduced portions 35 and 36.

Individual floats 37 and 38 are similar in form and may be in the form of hollow spheres, or other hollow forms and act to move the gauge rod upwardly away from the bottom of the tank compartment according to the amount of liquid in the compartment.

Each float comprises the hollow member and a bracket 39, 40, respectively, which has a U-shaped portion 41, 42 the bight portion of which is traversed by the respective threaded reduced portions 35 and 36 on the lower end of the gauge rod. These floats 37 and 38 are securely mounted in place on the gauge rod by means of nuts 43 and 44 on the reduced portions 35 and 36. The squared end portions of the bar 34 slide smoothly in the slots 21, of the guide tube 15.

The opening 45 in the bracket 13 is sufficiently large to permit the guide tube portion 14 to move upwardly and downwardly relative to the bracket 13 in response to vibration of the truck and in response to expansion and contraction due to temperature changes, and interposed between the bottom of the bracket 13 and a collar 46 threaded as indicated by the numeral 47 on the lower part of the portion 14, a helical spring designated 48 acts to keep the guide tube 15 flexibly down in place and to absorb shocks imparted by vibration to the guide tube 15. It is obvious that the asbestos or other compressible insulating material block 29 and the spring 48 cooperate to protect the apparatus against the effects of expansion and contraction as well as the destructive effects of vibration.

The gauge rod 20 is provided with graduations 49 formed on the exterior thereof in visible characters, and these graduations are applied to the rod by any suitable means of calibration and read from top to bottom. Figure 2 of the drawings shows by the position of the rod and the 30 gallon graduation at the top of the guide tube 15 that 120 gallons have been removed from the tank compartment 7 and that 30 gallons remain therein, this figure showing the invention in use on a 150 gallon tank.

Although I have shown and described herein a preferred embodiment of my invention, it is to be definitely understood that I do not desire to limit the application of the invention thereto, and any change or changes may be made in the materials and in the structure and arrangement of the parts, within the spirit of the invention and the scope of the subjoined claims. In this connection it is specifically pointed out that the invention is equally applicable without invention to types of domes and covers therefor, other than those described and shown herein.

What is claimed is:—

1. A tank gauge of the class described comprising a vertically arranged tubular member having longitudinally extending diametrically arranged slots therein, a bracket adapted to be connected to a top part of the tank and having an opening therein through which the upper end of tubular member passes, a projection on the upper part of the member, a spring seated on the projection and engaging a part of the bracket for yieldingly preventing upward movement of the member, a base connected with the lower end of the tubular member and including a block of compressible and non-conducting material for engaging the bottom of the tank, a float rod slidably arranged in the tubular member and having projections at its lower end passing through the slots and a float connected to each projection.

2. In combination with a tank having a cap receiving opening in its top, a bracket connected with a part of the tank under the opening and extending partly across the opening, said bracket having an opening therein, a tubular member having its upper end passing through the opening in the bracket, a base member connected with the lower end of the tubular member and including a block of compressible and nonconducting material engaging the bottom of the tank, yieldable means engaging a part of the tubular member and the bracket for holding the block against the bottom of the tank, a graduated rod slidably arranged in the tubular member, float means connected with the rod and a hinged cap connected with the upper end of the tubular member and provided with latch means for holding it in position closing the upper end of the tubular member to hold the rod entirely within said tubular member.

GERRIT A. VAN DE LUNE.